March 14, 1933.   G. W. BURCHETT   1,901,433
ARTIFICIAL LARYNX
Filed May 14, 1931   3 Sheets-Sheet 1
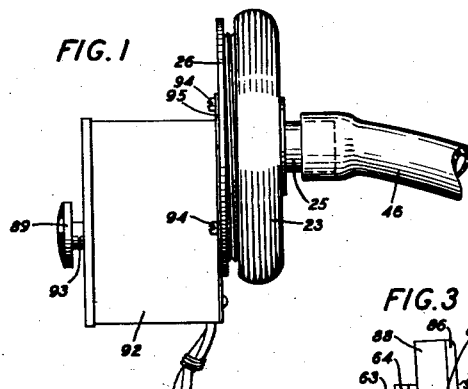
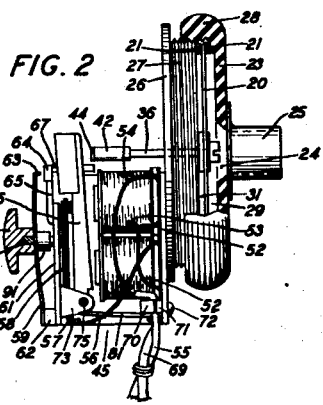
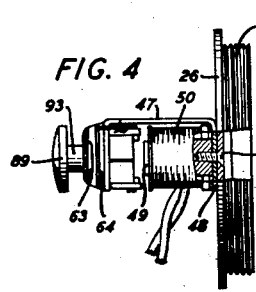
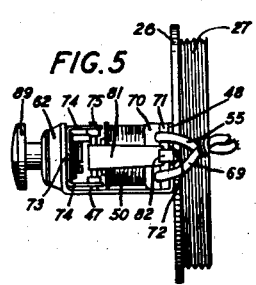
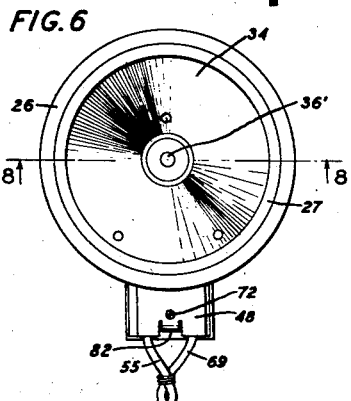
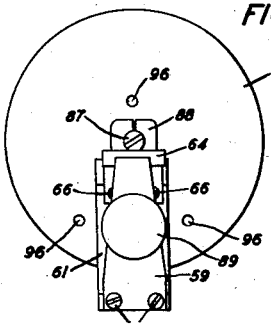
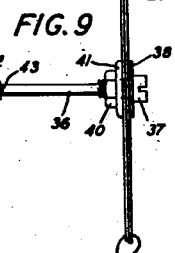
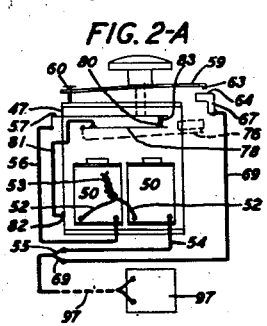
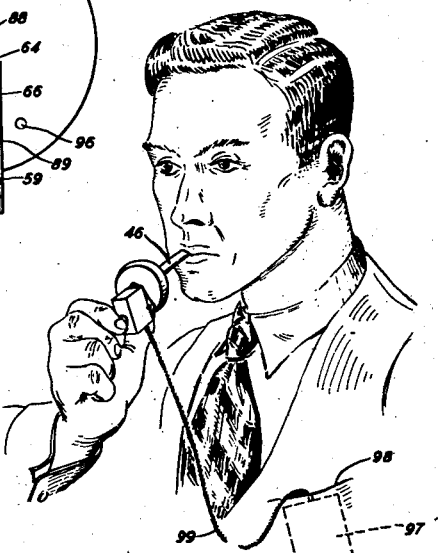
INVENTOR
G. W. BURCHETT
BY
*Walter C. Kiesel*
ATTORNEY March 14, 1933.    G. W. BURCHETT    1,901,433
ARTIFICIAL LARYNX
Filed May 14, 1931    3 Sheets-Sheet 2
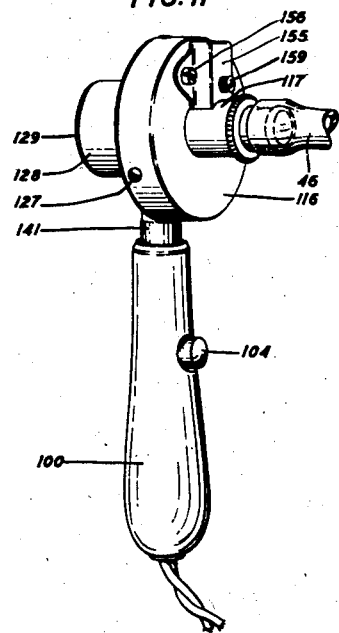
FIG. 11
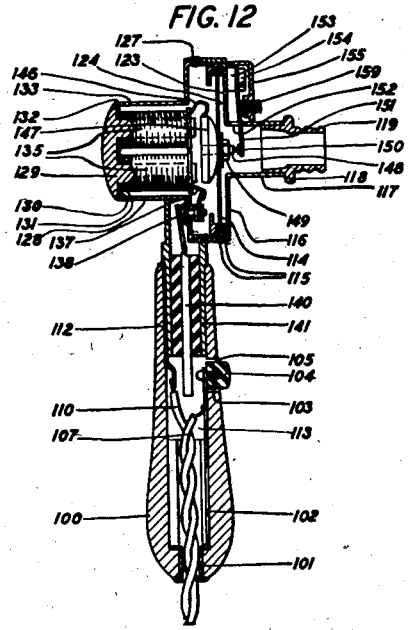
FIG. 12
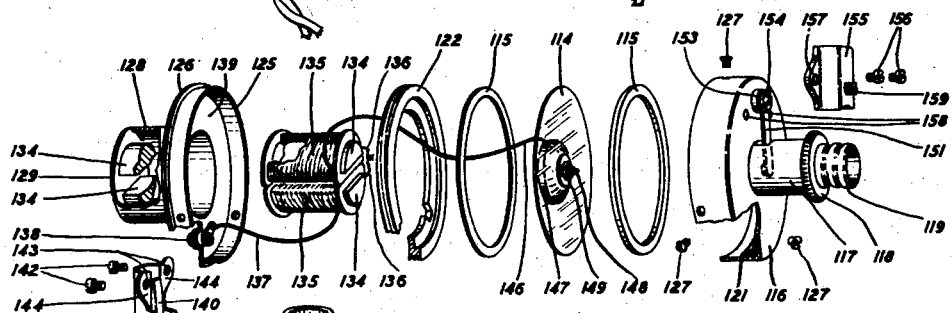
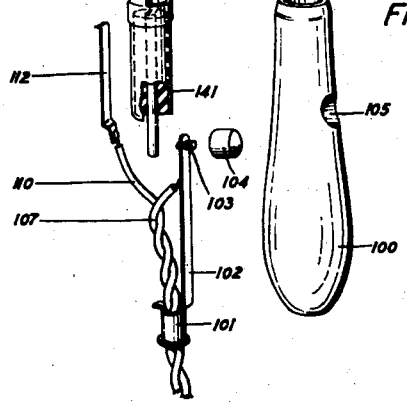
FIG. 13
FIG. 14
INVENTOR
G. W. BURCHETT
BY
Walter C. Kiesel
ATTORNEY March 14, 1933.                G. W. BURCHETT                  1,901,433
                               ARTIFICIAL LARYNX
                             Filed May 14, 1931            3 Sheets-Sheet 3
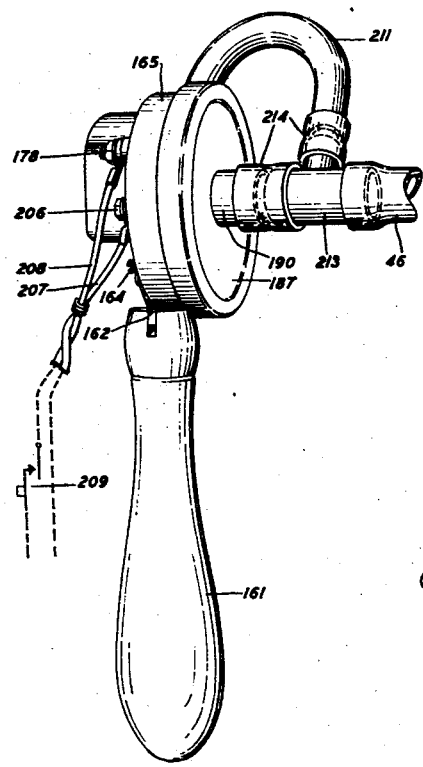
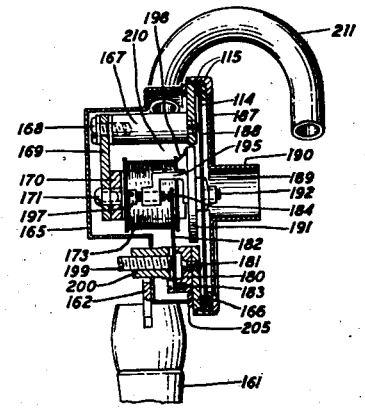
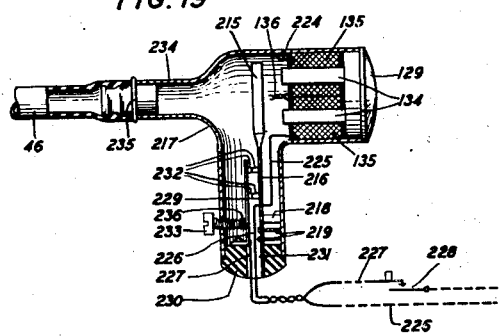
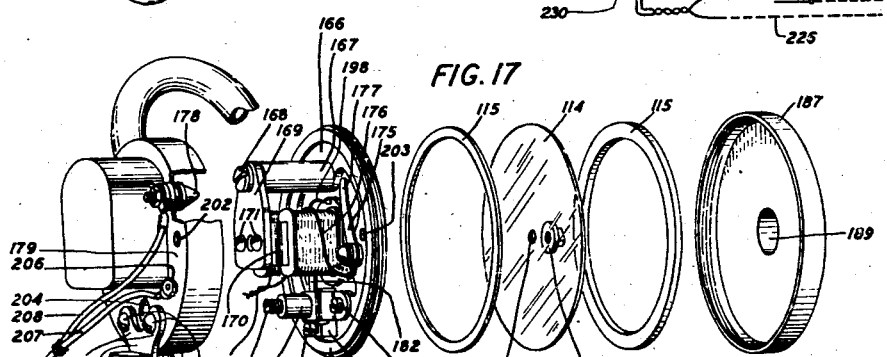
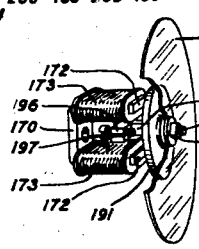
INVENTOR
G. W. BURCHETT
BY
Walter C. Kiesel
ATTORNEY

Patented Mar. 14, 1933

1,901,433

UNITED STATES PATENT OFFICE

GEORGE W. BURCHETT, OF PEEKSKILL, NEW YORK, ASSIGNOR TO BELL TELEPHONE LABORATORIES, INCORPORATED, OF NEW YORK, N. Y., A CORPORATION OF NEW YORK

ARTIFICIAL LARYNX

Application filed May 14, 1931. Serial No. 537,307.

This invention relates to an artificial larynx which is intended to restore the power of speech to a person who has had the natural larynx removed or to others having afflictions which impair the usefulness of the natural larynx.

More particularly, the artificial larynx of this invention utilizes a sound source produced by electrical means.

An object of this invention is to enable a person to produce articulate sounds through an artificial larynx which is simple in structure, efficient in operation, and which requires little, if any, attention or adjustment by the user.

Another object of this invention is to enable a person to produce articulate sounds through an artificial larynx without connecting the larynx with the trachea, or to a source of air, such as a bellows, or to a cylinder of compressed air.

A further object of this invention is to enable a person using an artificial larynx to produce articulate sounds which simulate natural articulate sounds.

A feature of this invention resides in an artificial larynx having an electrical source of sound which is to be converted into articulate speech in the oral cavities of the user.

Another feature of this invention resides in an artificial larynx which, in use, substantially eliminates strain of any kind on the lungs of the user, is operative without connection thereto, or to a source of air, such as a bellows or a compressed air cylinder, and does not interfere with the user's normal breathing.

A further feature of this invention resides in the structural details of an artificial larynx incorporating the features specifically mentioned above.

In accordance with this invention the improved artificial larynx comprises a casing or housing enclosing a sound wave generating vibratory member, preferably a diaphragm or a reed armature, and electromagnetic means for actuating the vibratory member. The vibratory member is adapted to generate a tone having a pitch which approaches as closely as possible the pitch developed by the natural larynx of a normal person. This tone is conveyed to the vocal cavities of the user of the larynx by a tubing connected to the casing in the region of the vibratory member. A preferable arrangement is to provide a switching mechanism which may be operated by the user of the larynx, for initially energizing the electromagnetic means, and to provide, also circuit controlling contacts which are operated by the vibratory member to open and to close the circuit thus established whereby, so long as the first switch is closed, the larynx will continue to produce sound. The pitch of the sound or tone may be adjusted by means to control the vibratory member.

A more complete understanding of this invention will be obtained from the following detailed description taken in conjunction with the appended drawings, wherein Fig. 1 is a side view of an artificial larynx embodying features of this invention and adapted to be held in the hand of a user;

Fig. 2 is a side view of the larynx of Fig. 1 partially in section with the casing removed to show details of structure;

Fig. 2—A shows schematically the electrical circuit of the larynx shown in Figs. 1 and 2;

Fig. 3 is an enlarged view of a portion of Fig. 2 partly in section to show the relation of the various elements;

Fig. 4 is a top view of Fig. 2 with the sound generating vibratory member and cap member removed;

Fig. 5 is a bottom view of Fig. 2 with the sound generating vibratory member and cap or face member removed;

Fig. 6 is a plan view of one portion of the casing with the cap member removed;

Fig. 7 is a plan view of the larynx shown in Fig. 1;

Fig. 8 is a sectional view of the casing portion shown in Fig. 6 along the line 8—8;

Fig. 9 is an enlarged side view of the sound generating vibratory member of the larynx of Fig. 2;

Fig. 10 illustrates how the artificial larynx of this invention may be utilized by a person deprived of the use of the natural larynx;

Fig. 11 is a perspective view of another embodiment of an artificial larynx incorporating features of this invention;

Fig. 12 is a cross-sectional view of the larynx shown in Fig. 11;

Fig. 13 is an exploded view of the larynx of Figs. 11 and 12;

Fig. 14 illustrates how the larynx of Fig. 11 may be utilized by a person deprived of the use of the natural larynx;

Fig. 15 is a perspective view of another embodiment of an artificial larynx comprising features of this invention;

Fig. 16 is a side view of the larynx of Fig. 15 partly in section to show the assembly;

Fig. 17 is an exploded view of the larynx of Figs. 15 and 16;

Fig. 18 is a perspective view of the electromagnet structure and sound generating member utilized in the larynx of Fig. 15; and Fig. 19 is a cross-sectional view of another embodiment of this invention.

There is shown in Figs. 1 to 10, inclusive, one embodiment of an artificial larynx incorporating features of this invention. It comprises a sound wave generating vibratory member or diaphragm 20 supported at its peripheral portion between washers 21—21 of resilient material, such as rubber, or fibrous material, such as paper or oiled fabric. The diaphragm is mounted in a sound box or casing comprising a cap or face member 23, for instance, of a phenol condensate product, or of wood, having a central aperture 24 and carrying, in alignment with the aperture, a flanged hollow connector member 25. The casing comprises also a metallic cup member 26, such as brass, having a circular exteriorly threaded portion 27 which is engaged by the interiorly threaded portion 28 of the cap 23. The peripheral portion of the diaphragm is held securely between the cap member and cup member. The diaphragm and cap member form a sound chamber 29 on one side and a sound chamber 31 between the diaphragm and the cup member. A sound absorbing filling material 34 having a surface sloping toward the center is contained within the member 26.

The diaphragm 20 may comprise a single or compound member of a vibratile metallic material, such as aluminum, tin, or thin sheet steel, an aluminum alloy, such as duralumin, or a vibratile non-metallic material, such as mica, impregnated fabric, phenolic condensation product, or the like. In a preferred embodiment, the diaphragm comprises two circular discs 35 of a material such as aluminum and shown in Fig. 9. Extending through a central opening in each of these discs is a screw, rod or driving member 36, having a head 37 engaging a washer member 38 adjacent one side of the diaphragm, and a threaded portion to receive a nut 40 and a lock washer 41 adjacent the other side of the diaphragm, whereby the driving member is securely attached to the diaphragm. A sleeve member 42 engages the threaded extremity 43 of the rod 36 and is provided with a cap portion 44, preferably of insulating material. The driving member 36 extends through a central opening 36' in the metallic cup member 26 and, upon being actuated or operated upon by the electromagnetic mechanism 45 sets the diaphragm vibrating to generate sound waves which are conveyed to the vocal cavities of the user through a sound conduit, tube or channel 46.

The electrical means or magnetic mechanism 45 for actuating the diaphragm comprises a U-shaped frame member or mounting bracket 47 having a leg portion 48 for supporting electromagnetic core members 49—49, each encircled by an energizing coil or winding 50. The core members are secured to the leg portion 48 by any suitable means, such as screws or rivets 51. At least one of the fastening means 51 extends, preferably, as shown in Fig. 4 through an opening in the cup member 26, to rigidly support the frame member 47 on the cup member. The energizing windings 50 are connected preferably in series, one free extremity, lead, or wire 52 of each of said windings being intertwined and soldered together as at 53. The other free extremity, lead or wire 54 of one coil is connected to the conductor 55 leading to a source of electric current, such as a battery, and the other free extremity, lead or wire 56 of the other coil is connected to a terminal member 57 in a self-interrupting, switching, or circuit making and breaking assembly 58.

The switching assembly comprises a bowed spring or contact making strip 59 secured at one extremity by suitable means, such as the screws 60 threading into leg portion 61 of the U-shaped frame member 47 with a spacing block 62 interposed between the spring and the frame member. This spring at its free and downwardly extending extremity 63 is normally out of engagement with a terminal member 64 secured to a strip 65 of insulating material which is fastened to the frame portion 61 by suitable means, such as the screws 66. The member 64 has a depending extension 67 to which is connected a conductor 69 leading to a source of electric current, such as a battery. The conductors 55 and 69 are clamped between members 70 and 71 which are secured to the frame portion 48 by a screw 72. Secured to one surface of the frame portion 61 is a U-shaped trunnion member 73, the arms 74 of which are drilled to receive a shaft or axis 75 extending therebetween and providing a pivotal support for an armature member 76. The armature, which is of a suitable magnetic material, such as soft iron, has a channel portion 77 in which a spring member 78 is secured by suitable means, such as the rivet 79. The spring member 78 is provided with a contact 80 at its free end and a retractile resilient spring 81 extending downwardly beyond the shaft 75 and secured to an upwardly extending lug 82 of the frame member portion 48.

The spring 81 is flexed so that it maintains the armature away from the cores 49 and the contact 80 in engagement with a stationary contact 83 on the surface of the strip 57. The element 57 is insulated from the trunnion member 73 by a strip 84 of insulating material and from the armature and the spring member 78 by a small piece 85 of insulating material. The armature 76 is constructed, preferably, of considerable mass at its free extremity 86 to insure positive and forcible movement thereof when the armature is magnetically actuated. This is accomplished by securing to the extremity, for instance, by a screw member 87, a mass or weight 88, of iron or, more preferably, of a material, such as brass or lead. It is apparent from the showing in Fig. 2 that the rod member 36 is so positioned with reference to the free extremity of the armature that when the latter vibrates the rod will be actuated to cause the diaphragm to generate sound waves.

The position of the bowed spring 59, preferably, is controllable manually by a plunger button 89, of insulating material, which projects from a stud 90 extending through aligned openings in spring 59, frame member portion 61 and strip 84, the stud being secured to the member 57. The stud is enclosed by a sleeve 91 of insulating material whereby metallic connections between the members 57, 59 and portion 61 are avoided.

The magnetic mechanism 45 is normally enclosed by preferably, a sheet metal cover 92 through which the shank portion 93 of the button 89 extends. The cover is removably secured to the metallic cup member 26 by suitable means, such as screws 94, extending through openings in the portions 95 of the cover and threading into tapped drillings 96.

The operation of the artificial larynx, above described, in generating a tone comprising sound waves to be modulated in the vocal cavities of a user thereof is now to be explained with particular reference to Fig. 2—A. The larynx may be held in the hand of a user as shown in Fig. 10, a battery 97 being carried, for instance, in the jacket breast pocket 98, or other suitable place upon the user's person, and connected to the larynx through the cord 99 enclosing the conductors 55 and 69. The thumb resting against the face member 23 and one finger or more against the button 89 afford sufficient support for the larynx. The latter is set into operation by the depression of button 89 so that the extremity 63 of member 59 contacts with the terminal 64 whereby a circuit is completed to energize the cores 49 whereupon the armature is attracted to the cores and the circuit is broken at contacts 80 and 83 by the movement of the armature and consequently of the spring 78. The armature, therefore, after striking the rod 36 and actuating the diaphragm, returns under the restoring action of spring 78 and its extension 81 to its initial position where the circuit is again closed. This self-interrupting action continues so long as the contact is maintained between the extremity of spring 59 and terminal 64.

The magnetic mechanism, therefore, by the striking action of the armature against the rod 36 will generate tones or sound waves in the sound chamber or casing which are led through the conduit 46 into the mouth of the user. The user modulates these tones into articulate speech. If the user desires to vary the pitch of the "speaking" voice to give expression and distinctiveness thereto, he may do so by varying the pressure which is exerted on the button 89, thereby controlling, not only the contact between extremity 63 and terminal 64, but also the position of the armature with reference to the magnet cores 49, to shorten the distance through which the armature moves before striking the rod or diaphragm driving member 36.

Although the above described larynx is shown in Fig. 10 as held between the thumb and index finger, it is apparent that it may be entirely concealed in the palm of the hand, the operation of the device being controlled by the pressure of the palm upon the button 89.

The artificial larynx described is compact and positive in operation. It has been found to produce a tone comprising sound waves which when modulated approach in naturalness the articulate sound waves produced by the natural larynx. It is apparent, also, that the diaphragm may be readily removed when desired to cleanse it or to treat it with a disinfectant merely by unscrewing and removing the face member 23 and lifting the driving rod 36 out through the opening 36'. Producing an artificial larynx tone by electrical means, as comprised by this invention, obviates utilizing an air stream from the lungs, or from a bellows, or from a compressed air cylinder, to operate a sound generating member. It is apparent that the artificial larynx of Figs. 1 to 10 may be utilized, because of its simplicity and compactness, without embarrassment by a user, attracting a minimum of attention since it may be substantially entirely concealed while in use.

Another embodiment of an artificial larynx comprising features of this invention is disclosed in Figs. 11 to 14, inclusive. This embodiment is adapted to be held in the hand of a user, as shown clearly in Fig. 14, by a supporting member or handle 100, preferably hollow, to provide an enclosure for a switching mechanism or contact spring arrangement whereby the user can manually control the operation of the larynx. This contact spring arrangement comprises a hollow, cylindrical insert or member 101 having a spring extension 102, the insert being force-fitted, preferably, into one end of the handle 100. The extension 102 is provided with a stud 103 secured thereto as by welding. A control or finger button 104, preferably of insulating material, is positioned in the opening 105 of the handle and engages the stud 103. To the extension 102 is secured, for instance, by soldering, a conductor 107 connected to a source of electric current, such as a battery 97, which may be carried by the user of the larynx in the jacket breast pocket 98. The other conductor 110, connected also to the source of electric current is attached, for instance, by soldering, to a strip 112 of spring metal. The conductors 110 and 107 extend into the hollow portion 113 of the handle through the central aperture of member 101.

The larynx proper comprises a diaphragm 114, for instance, of mica or other suitable material, which is positioned at its periphery between soft washers 115, which may be of a fibrous material or of a material such as soft rubber whereby the diaphragm periphery although firmly held is not rigidly secured against movement, so that the diaphragm may move substantially freely. The diaphragm is mounted in a sound box comprising a cap or face member 116 having a centrally disposed hollow extension 117 into which is force-fitted, preferably, a hollow connector member 118 having a threaded or irregular contoured portion 119 which is engaged by a sound wave conduit, tube, or channel member 46. The sound wave conduit member is preferably of a flexible material, such as soft rubber, although a metallic or inflexible rubber composition material may be employed, and is adapted for insertion into the mouth of a user of the artificial larynx. The cap 116 is provided with an interiorly threaded portion 121 which receives an exteriorly threaded flanged clamping ring 122, to hold the diaphragm properly clamped at its periphery between the washers 115. It is apparent that one of the washers 115 functions also as a means to properly space the diaphragm from the surface 123 of the cap 116 with which it forms in association with the diaphragm a sound chamber 124.

The cap 116 fits over an annular flanged portion 125 of a cup member 126 comprising another member of the sound box and is secured thereto by suitable means, for instance, the screws 127. The member 126 comprises a rearwardly extending, hollow, open-ended, cylindrical portion 128 within which is mounted an electromagnetically energizable member 129. The member 129 is machined, preferably, from a single piece of magnetic material, such as soft iron, and has an annular surface 130 engaging the rim 131 of the portion 128, a shoulder portion 132 having a force-fit engagement with the inner surface 133 of the portion 128, and a pair of semi-circular shaped cores 134. An energizing coil 135 is wound on each core and these coils are connected, preferably, in series by the extremities, leads, or wires 136. The other extremity 137 of one coil 135 is connected to a terminal or binding post 138 which is mounted on a flange portion 139 of the member 126 and electrically insulated therefrom. This terminal 138 is normally engaged by a conductive element or contact member 140 rigidly held by a tubular insulator 142 fitted in a hollow metallic sleeve member 141. The sleeve member is secured to the casing member 126 by suitable means, such as the screws which extend through openings 143 in the ears 144 and thread into the member 126. The contact member 140 projecting from the tubular insulator is adapted to be engaged by the extension 102 when the button 104 is depressed. The sleeve member, as indicated clearly in Fig. 12, extends into the hollow handle 100 and engages the strip 112 between it and the handle, the strip functioning not only as a conductor but also as a wedge member to hold the sleeve within the handle.

The wire 146 of the other coil 135 is attached, as by soldering, to a circular armature 147, of magnetic material, such as soft iron, mounted on the central portion of the diaphragm 114, and secured thereto by a metallic stud member 148 and nut 149, in spaced relation to the cores 134. Engaging with the stud 148 is the free extremity 150 of a metallic spring member 151 which extends through an opening 152 in the extension 117 and is rigidly fastened in spaced relation to, but in conductive connection with, the face member by a block 153 and screw 154. This spring member is housed, preferably, by an enclosing member 155 which is secured to the face member by suitable means, such as the screws 156, which extend through the portions 157 and are threaded into the tapped drillings 158. A set screw 159 is carried by the enclosing member 155 and may be adjusted externally to bear with greater or less pressure upon the spring member 151, to control the vibrations of the sound wave generating member or diaphragm 114 when the latter is actuated.

The operation of the larynx described with reference to Figs. 11 to 14 inclusive will now be described. As was pointed out above, the member 140 is normally in contact with terminal 138. The contact spring 151 is normally in contact with the stud 148 and the extension 102 is normally out of contact with the member 140. The larynx is held in the hand of a user, for instance as shown in Fig. 14, with the sound wave conduit 46 extending into the mouth cavity and, therefore, leading to the vocal cavities of the user. The conductors 107 and 110 form a cord 160 connecting the electrical circuit of the larynx with the battery 97. By pressing the button 104 so as to bring extension 102 into electrical contact with member 140 an energizing current flows through the coils 135 and the diaphragm is caused to generate sound waves. The diaphragm will vibrate inasmuch as the armature will be attracted toward the cores 134 and simultaneously will break the circuit at stud 148 and spring 151. In returning to its original position, the armature stud 148 will complete the circuit again. It is apparent, therefore, that, so long as the button 104 is maintained in its depressed condition, the vibration of the diaphragm or sound wave generating member will be continued. This artificial larynx, like the one described with reference to Figs. 1 to 10, inclusive, incorporates a self-interrupting as well as initial operation controlling means. The sound waves generated by the device are conducted through the conduit 46 into the user's vocal cavities to be modulated. It is apparent, also, that by adjustment of the set screw 151 the contact pressure may be regulated between stud 149 and the extremity 150 of spring 151, whereby the pitch of the sound waves generated by the larynx may be controlled. Although the face member 116 and the rear member 126 have been disclosed as comprising elements in the electric circuit for the larynx, it is to be understood that they may be of an insulating material inasmuch as the electric circuit between the contact spring 151 and the conductor 110 may, if desired, consist of a lead, wire, or other conductor.

A further embodiment of this invention is disclosed in Figs. 15 to 18 inclusive. This embodiment is capable of being held in the hand of a user in a manner similar to that shown in Fig. 14 by a supporting member or handle 161. This handle, preferably of a non-conductive material, is provided with a metallic punching 162 having a pair of flaring arms 163 through which extend screws 164, to secure the handle to a metallic casing or member 165.

A centrally apertured ring member 166, preferably of a non-magnetic material, such as brass, provides a support for a standard 167 to which is secured by suitable fastening means, such as the screw 168, a plate member 169 preferably of non-magnetic material. This plate 169 carries a U-shaped member 170 of electromagnetically energizable material, such as soft iron, the piece and the plate being fastened together by suitable securing means, such as the screws 171. The arms 172 form cores for windings or coils 173 connected preferably in series, as at 174.

A spring or contact member 175 is supported on, but insulated from the member 166 and has connected thereto one extremity, lead or wire 176 of one of the coils 173. At its free extremity 177, the spring 175 is adapted to engage with an insulated terminal or binding post 178 mounted on the disc portion 179 of the casing member 165. The member 166 provides a support for a block or spacer 180 secured thereto, for instance, by a screw 181, the block supporting a contact spring or member 182 which is fastened to the block by a screw 183 and the free extremity 184 of the spring extends between the coils 173.

The sound wave generating vibratory member or diaphragm 114, preferably of mica, or other suitable material, is disposed at its periphery between washers 115, preferably of a resilient material, and secured to the ring member 166 by a cap or face member 187 interiorly threaded which engages the externally threaded portion of member 166 and forms a sound chamber 188 with the diaphragm. The cap 187 has a central aperture 189 and a connector portion 190. The diaphragm has attached to its central portion a flat disc armature 191, of magnetic material, having a central threaded extension 192 projecting through a central opening 193 of the diaphragm and engaged by the nut 194. The armature member is in space relation to cores 172 and carries a metallic L-shaped member 195 disposed in the space between the windings 173. The member 195 has a bifurcated portion 196 to receive a screw member 197 which normally engages the free extremity 184 of the spring 182. The extremity, lead, or wire 198 of the other coil 173 is attached, as by soldering, to the armature. A set screw 199, externally adjustable, is provided near the fixed extremity of the spring 182 and is supported in the bridge member 200 fastened to the ring member 166 by suitable means, such as the screws 201. The assembly comprising the cap 187, the diaphragm 114 and the ring member 166 with the apparatus mounted thereon is secured within the casing 165 by suitable means such as screws extending through the openings 202 in the member 165 and threading into tapped drillings 203 in the ring 166. It will be noted that the set screw and a portion of the member 200 extend through the opening 204 in the casing and are in electrically conductive contact therewith. It is apparent that the casing 165 forms an element in the electric circuit of the artificial larynx. The casing carries a terminal 206 to which conductor 207 is connected. Another conductor 208 is attached by suitable means to the terminal 178. The assembly is electrically insulated from the casing 165 by a washer 205, of a suitable material, such as soft rubber.

The larynx described with reference of Figs. 15 to 18 inclusive may be set into operation in the following manner: A contact spring arrangement or switching mechanism 209, shown schematically, and which may be mounted on the handle 161 or carried on the person of the user of the larynx, is operated to energize the magnet structure and the armature is magnetically attracted toward the cores 172 to break the contact between extremity 184 of the spring 182 and that of screw 197. The magnetic structure is then deenergized and the armature returned to its initial position thereby closing the broken contact whereby the magnet structure is again energized. This cycle occurs continuously so long as the contact spring arrangement 209 is maintained closed, and the sound wave generating member will produce sound waves which, as in the previously described embodiments, are conveyed to the mouth of a user of the larynx to be modulated into articulate sounds. The pitch of the sound waves is controllable by the adjustment of the pressure of the set screw 199 on the spring 182. It is to be noted that the larynx shown in Figs. 15 to 18 differs from those previously described in that the sound waves given off from both surfaces of the diaphragm are utilized. In this embodiment, a sound chamber 210 between the casing 165 and the diaphragm 114 is provided with a vent comprising a curved conduit or tube 211 which extends around to the front of the larynx and discharges into the sound wave conduit 46 leading to the mouth of the user. This is accomplished by inserting a hollow T connector 213 between the portion 190 of the face member 187 and the tube 46 by flexible couplers 214, for instance, of soft rubber. It is apparent that the connector 213, the tube 211 and the portion 190 may be united integrally as by welding. It is also apparent that the arrangement described for combining the sound wave emanations of each surface of the diaphragm may readily be incorporated in the embodiments of this invention described with reference to Figs. 1 to 10 inclusive and Figs. 11 to 14 inclusive.

Still another embodiment of this invention is shown in Fig. 19. In this arrangement the sound wave generating vibratory member comprises an armature 215 supported on a metallic reed or strip 216 which is fastened in the interior of a hollow T-shaped metallic casing 217 by a block 218 and screws or rivets 219. The casing provides an enclosure for the armature and a magnet structure similar to that designated in Figs. 12 and 13. One winding is attached, as by soldering, to the casing while the other winding is connected to a conductor 226. Another conductor 227 leading from the contact spring arrangement or switching mechanism 228 (shown schematically) is attached, as by soldering, to an upwardly extending contact spring member 229 which is in conductive contact normally with the reed or strip 216. The member 229 is fastened, preferably, to a force-fitted insert 230, of insulating material, which is provided with a central aperture 231 through which the conductors 226 and 227 enter the casing. The pressure between the contact portions 232 of the members 216 and 229 may be regulated by the externally adjustable set screw member 233 threading through the casing and engaging the member 229. Inserted in the hollow portion 234 of the casing is a connector member 235 having an irregular surface for engagement by a sound conduit, tube, or channel member 46 leading to the mouth of a user of the larynx.

The larynx is caused to operate by the closing of the contact spring arrangement 228 to energize the magnet structure and attract the armature to the cores 134. The movement of the armature and strip 216 will cause the energizing circuit to be broken at the contacts 232 and the armature consequently returning to its initial position. The energizing circuit will again be completed and the cycle repeated. This will continue so long as the circuit is maintained closed at the switch 228 and the armature will produce sound waves which when conveyed to the mouth of a user of the larynx through the conduit 46 may be modulated into articulate speech.

While the features of this invention have been disclosed in various specific structures, it is understood of course, that various modifications may be made in the details of construction without departing from the scope of the invention as defined in the appended claims.

What is claimed is:

1. An artificial larynx comprising electrical means for producing sound waves, and means for conducting said sound waves into the vocal cavities of a user of said larynx.

2. An artificial larynx comprising a sound wave generating member, electromagnetic means for actuating said member, and means for conducting sound waves into the vocal cavities of a user of said larynx.

3. An artificial larynx comprising a sound wave generating member, electromagnetic means for actuating said member, a metallic casing for said means and member, an energizing circuit for said means, said casing forming a part of said circuit, and means for conducting sound waves into the vocal cavities of the user of the larynx.

4. An artificial larynx comprising a sound wave generating member, electrical means for actuating said member, an energizing means for said electrical means, means for controlling said energizing means, and a sound wave conducting member to introduce sound waves into the vocal cavities of a user of the larynx.

5. An artificial larynx comprising a sound wave generating member, magnetic means for actuating said member, means for energizing said magnetic means, means for initially operating said energizing means, means for intermittently interrupting said energizing means, and a sound wave conduit for directing sound waves into the vocal cavities of the user of the larynx.

6. An artificial larynx comprising a sound wave generating electrical means, means for regulating the pitch of the sound generated by said first mentioned means, and means for conducting sound waves generated into the vocal cavities of a user of the larynx.

7. An electrical larynx comprising a sound wave generating member, electrical means for actuating said member, an energizing circuit for said means, means for regulating the pitch of the sound generated by said member, and means for conducting sound waves from said generating member to the vocal cavities of a user of the larynx.

8. An electrical larynx comprising a sound wave generating member, means for actuating said member, energizing means for said actuating means, means simultaneously controlling said energizing means and regulating the pitch of the sound generated by said member, a sound chamber being adjacent said member, and a sound wave conduit leading from said chamber for conducting sound waves into the vocal cavities of the user.

9. An artificial larynx comprising a diaphragm, an armature secured thereto, electromagnetic means for vibrating said armature and diaphragm whereby sound waves are generated by said diaphragm, and means for conducting said sound waves into the vocal cavities of a user of said larynx to be converted into articulate speech.

10. An artificial larynx comprising a diaphragm, a driving rod secured to the diaphragm, electromagnetic means for actuating said diaphragm and driving rod, and means for conducting sound vibrations from said diaphragm to the vocal cavities of a user of the larynx.

11. An artificial larynx comprising a diaphragm, a driving rod secured to the central portion of the diaphragm, a vibratory armature of magnetic material in spaced relation to said rod, means to cause said armature to repeatedly strike said rod thereby causing said diaphragm to generate sound waves, and means to conduct said sound waves into the vocal cavities of a user of said larynx.

12. An artificial larynx comprising a diaphragm, a rod secured to the central portion of the diaphragm, a vibratory armature in spaced relation to said rod, said armature having the greater portion of its mass concentrated adjacent said rod, means to cause said armature to repeatedly strike said rod to generate sound waves from said diaphragm, and means to conduct said sound waves into the vocal cavities of a user of the larynx.

13. An artificial larynx comprising a sound wave generating reed member, electromagnetic means for actuating said reed, and means for conducting the sound waves generated into the vocal cavities of a user of the larynx.

14. In an artificial larynx, a sound wave generating member, means to actuate said member, and means for conducting the sound emanations from each surface of said member to the vocal cavities of a user of the larynx.

15. In an artificial larynx, a casing, a sound wave generating member in said casing dividing said casing into a plurality of sound chambers, means to actuate said member, means connected to each of said sound chambers for combining the sound emanations from each surface of the sound generating member, and means for conducting said combined emanations into the vocal cavities of a user of the larynx.

16. An artificial larynx comprising a casing, a sound wave generating member in said casing dividing said casing into two chambers, electromagnetic means for actuating said sound generating member, and means for conducting sound waves from each of said chambers to the vocal cavities of a user of the larynx.

17. An artificial larynx comprising a sound wave generating member, electromagnetic means for actuating said member, energizing means for said electromagnetic means, means for manually controlling said energizing means, and means for conducting sound waves generated into the vocal cavities of the user of the larynx.

In witness whereof, I hereunto subscribe my name this 12th day of May, 1931.

GEORGE W. BURCHETT.